(12) United States Patent
Morikazu

(10) Patent No.: US 11,933,667 B2
(45) Date of Patent: Mar. 19, 2024

(54) INSPECTION APPARATUS AND INSPECTION METHOD

(71) Applicant: DISCO CORPORATION, Tokyo (JP)

(72) Inventor: Hiroshi Morikazu, Tokyo (JP)

(73) Assignee: DISCO CORPORATION, Tokyo (JP)

(*) Notice: Subject to any disclaimer, the term of this patent is extended or adjusted under 35 U.S.C. 154(b) by 316 days.

(21) Appl. No.: 17/190,629

(22) Filed: Mar. 3, 2021

(65) Prior Publication Data

US 2021/0291295 A1 Sep. 23, 2021

(30) Foreign Application Priority Data

Mar. 18, 2020 (JP) ................. 2020-047561

(51) Int. Cl.
| | |
|---|---|
| *G01J 1/42* | (2006.01) |
| *B23K 26/03* | (2006.01) |
| *B23K 26/046* | (2014.01) |
| *B23K 26/064* | (2014.01) |
| *B23K 26/073* | (2006.01) |
| *B23K 26/70* | (2014.01) |
| *B23Q 3/06* | (2006.01) |
| *G01M 11/02* | (2006.01) |

(52) U.S. Cl.
CPC .......... *G01J 1/4257* (2013.01); *B23K 26/032* (2013.01); *B23K 26/046* (2013.01); *B23K 26/064* (2015.10); *B23K 26/073* (2013.01); *B23K 26/705* (2015.10); *B23Q 3/067* (2013.01); *G01M 11/02* (2013.01)

(58) Field of Classification Search
CPC ... G01J 1/4257; B23K 26/032; B23K 26/046; B23K 26/064; B23K 26/073; B23K 26/705; B23Q 3/067; G01M 11/02

USPC ............................................ 356/213
See application file for complete search history.

(56) References Cited

U.S. PATENT DOCUMENTS

| | | | | |
|---|---|---|---|---|
| 5,608,492 A | * | 3/1997 | Sato ................. | G03F 7/70358 355/68 |
| 6,839,975 B2 | * | 1/2005 | Fujishima ......... | B23Q 17/2233 33/645 |
| 7,714,251 B2 | * | 5/2010 | Miyairi ............ | B23K 26/073 438/795 |
| 2006/0083420 A1 | * | 4/2006 | Kawaguchi ...... | G06T 5/009 382/149 |
| 2012/0256563 A1 | * | 10/2012 | Tsubota ........... | B23K 26/0626 315/501 |

(Continued)

FOREIGN PATENT DOCUMENTS

| | | | |
|---|---|---|---|
| JP | 10305420 A | | 11/1998 |
| JP | 2002192370 A | | 7/2002 |
| JP | 2010141237 A | * | 6/2010 ........... B08B 7/0042 |

*Primary Examiner* — Michelle M Iacoletti
*Assistant Examiner* — Noah J. Haney
(74) *Attorney, Agent, or Firm* — GREER BURNS & CRAIN, LTD

(57) ABSTRACT

An inspection apparatus for a laser oscillator includes a dimming plate that dims a laser beam immediately after the laser beam is emitted from the laser oscillator; an imaging unit that images, with a plurality of pixels, the laser beam dimmed by the dimming plate; a processing unit that processes an image captured by the imaging unit; and a display unit that displays the image processed by the processing unit. The processing unit has at least two thresholds of an inner ring and an outer ring used for partitioning the intensity of the laser beam.

2 Claims, 4 Drawing Sheets

(56) References Cited

U.S. PATENT DOCUMENTS

2018/0088358 A1* 3/2018 Kliner .................. B23K 26/034
2018/0217410 A1* 8/2018 Martinsen .......... G02B 27/0933
2019/0076960 A1* 3/2019 Yamaguchi ........ B23K 26/0648

* cited by examiner

INSPECTION APPARATUS AND INSPECTION METHOD

BACKGROUND OF THE INVENTION

Field of the Invention

The present invention relates to an inspection apparatus and an inspection method for inspecting the accuracy of a laser oscillator that oscillates laser.

Description of the Related Art

A wafer with a plurality of devices such as integrated circuits (ICs) and large-scale integrated circuits (LSIs) formed on a front surface thereof that is partitioned by a plurality of intersecting streets is divided into individual device chips by a dicing apparatus or a laser processing apparatus, and the respective device chips thus divided are used in electric equipment such as a mobile phone and a personal computer.

The laser processing apparatus generally includes a chuck table that holds the wafer, a laser beam applying unit that applies a laser beam to the wafer held by the chuck table, and a feeding mechanism that subjects the chuck table and the laser beam applying unit into relative processing feeding.

As a laser beam applying unit, there are two types, that is, a type in which a laser beam of such a wavelength as to be absorbed in a workpiece is applied to the workpiece to form grooves in an upper surface of the workpiece by ablation (see, for example, Japanese Patent Laid-open No. Hei 10-305420) and a type in which a laser beam of such a wavelength as to be transmitted through a workpiece is applied to the workpiece, with a focal point of the laser beam positioned inside the workpiece, to form modified layers in the inside of the workpiece (see, for example, Japanese Patent No. 3408805). In such laser processing apparatuses, M2 measurement equipment is used for confirming an equal beam (a line connecting a plurality of points of the same intensity) in Gaussian distribution of the laser beam.

SUMMARY OF THE INVENTION

However, the M2 measurement is performed to observe the shape of a spot condensed by a beam condenser, and it is impossible to detect, with sufficient resolution, the equal beam in the Gaussian distribution of the laser beam; in practice, a subtle distortion of the spot shape (distortion of the equal beam) is often found as a result of processing of applying the laser beam to the workpiece, and it leaves a problem that the M2 measurement offers an accuracy for only reference and lacks reliability.

Accordingly, it is an object of the present invention to provide an inspection apparatus and an inspection method by which an equal beam in Gaussian distribution of a laser beam can be detected with high accuracy.

In accordance with an aspect of the present invention, there is provided an inspection apparatus that inspects the accuracy of a laser oscillator that oscillates laser. The inspection apparatus includes a dimming plate that dims a laser beam immediately after the laser beam is emitted from the laser oscillator; an imaging unit that images, with a plurality of pixels, the laser beam dimmed by the dimming plate; processing means that processes an image captured by the imaging unit; and a display unit that displays the image processed by the processing means. The processing means has at least two thresholds of an inner ring and an outer ring used for partitioning the intensity of the laser beam, and the display unit displays the inner ring and the outer ring.

Preferably, the processing means has at least a threshold of an intermediate ring between the threshold of the inner ring and the threshold of the outer ring. Preferably, the processing means calculates a deviation amount between the center of the inner ring and the center of the outer ring or the center of the intermediate ring, and the display unit displays the deviation amount.

In accordance with another aspect of the present invention, there is provided an inspection method for a laser oscillator of a laser processing apparatus including the laser oscillator that oscillates laser, a beam condenser that condenses a laser beam, an optical system that is disposed between the laser oscillator and the beam condenser and that guides the laser beam, and a chuck table that holds a workpiece subjected to processing by the laser beam condensed by the beam condenser. The inspection method includes an imaging unit positioning step of positioning an imaging unit between the laser oscillator and the beam condenser of the laser processing apparatus; an imaging step of imaging the laser beam by the imaging unit immediately after the laser beam is emitted from the laser oscillator; a processing step of processing an image captured by the imaging unit, by processing means; and an inspecting step of displaying the image processed by the processing means on the display unit and inspecting the accuracy of the laser oscillator based on the image displayed on the display unit.

According to the inspection apparatus of the present invention, an equal beam in Gaussian distribution of a laser beam can be detected with high accuracy.

According to the inspection method for a laser oscillator of the present invention, an equal beam in Gaussian distribution of a laser beam can be detected with high accuracy.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
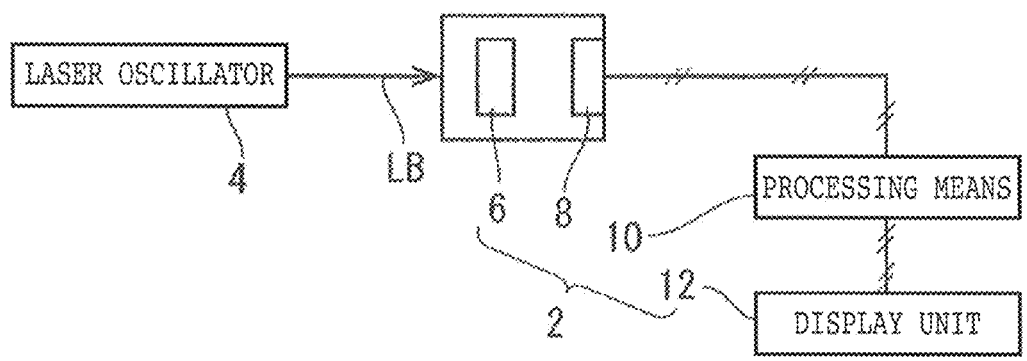
FIG. 1 is a block diagram of an inspection apparatus according to an embodiment of the present invention.

Preferable embodiments of an inspection apparatus and an inspection method of the present invention will be described below referring to the drawings. In FIG. 1, an inspection apparatus 2 includes a dimming plate 6 that dims a laser beam LB immediately after the laser beam LB is emitted from a laser oscillator 4, an imaging unit 8 that images, with a plurality of pixels, the laser beam LB dimmed by the dimming plate 6, processing means 10 that processes the image captured by the imaging unit 8, and a display unit 12 that displays the image processed by the processing means 10.

As the dimming plate 6, appropriate dimming means such as a neutral-density (ND) filter may be used. The dimming plate 6 is disposed just behind the laser oscillator 4 that oscillates the laser beam LB (what is called seed light), for example, having a repetition frequency of approximately several tens of megahertz and an output of approximately several milliwatts. In other words, the laser beam LB emitted from the laser oscillator 4 is dimmed by the dimming plate 6 and is then imaged by the imaging unit 8, before the repetition frequency is converted by repetition frequency converting means (not illustrated) and before the output is amplified by an output amplifier (not illustrated).

The imaging unit 8 may be, for example, a charge-coupled device (CCD) camera and images the section (section orthogonal to the optical axis) of the laser beam LB dimmed by the dimming plate 6, with a plurality of pixels.

The processing means 10 may include a computer. The processing means 10 includes a central processing unit (CPU) that performs arithmetic processing according to a control program, a read only memory (ROM) that stores the control program and the like, and a random access memory (RAM) that is readable and writeable and that stores a result of the arithmetic processing and the like. The processing means 10 is electrically connected to the imaging unit 8, and a sectional image obtained by imaging the section of the laser beam LB orthogonal to the optical axis by the imaging unit 8 is sent to the processing means 10.

The processing means 10 has at least two thresholds of an inner ring and an outer ring used for partitioning the intensity of the laser beam LB. The processing means 10 in the present embodiment further has a threshold of an intermediate ring between the threshold of the inner ring and the threshold of the outer ring. The threshold of the inner ring is greater than the threshold of the intermediate ring and the threshold of the outer ring, and the threshold of the intermediate ring is greater than the threshold of the outer ring (threshold of inner ring>threshold of intermediate ring>threshold of outer ring). Note that the processing means 10 may have three or more thresholds.

The processing means 10 performs four-valued processing on the sectional image of the laser beam LB based on the three thresholds of the inner ring, the intermediate ring, and the outer ring, and partitions the sectional image of the laser beam LB according to the intensity of the laser beam LB. As is understood by referring to FIGS. 2A and 2B, the processing means 10 partitions the sectional image of the laser beam LB into a circular first region R1 (black region) where the intensity of the laser beam LB is greater than the threshold of the inner ring, an annular second region R2 (light grey region) where the intensity of the laser beam LB is smaller than the threshold of the inner ring but greater than the threshold of the intermediate ring, an annular third region R3 (dark grey region) where the intensity of the laser beam LB is smaller than the threshold of the intermediate ring but greater than the threshold of the outer ring, and a fourth region R4 (white region) where the intensity of the laser beam LB is smaller than the threshold of the outer ring.

Figure 2A:
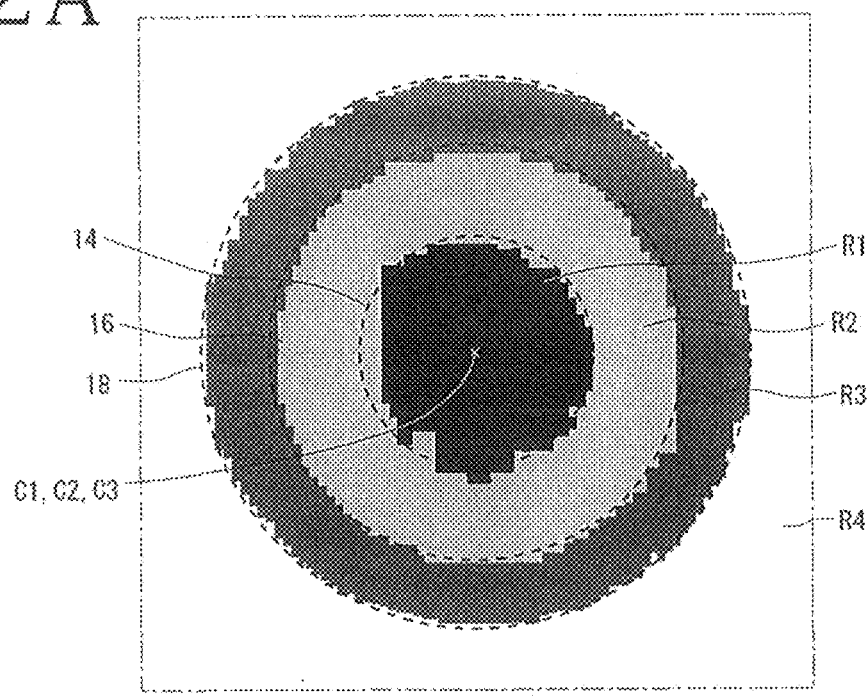
FIG. 2A is a schematic diagram of a sectional image of a laser beam in which the respective centers of an inner ring, an intermediate ring, and an outer ring agree with each other.
Figure 2B:
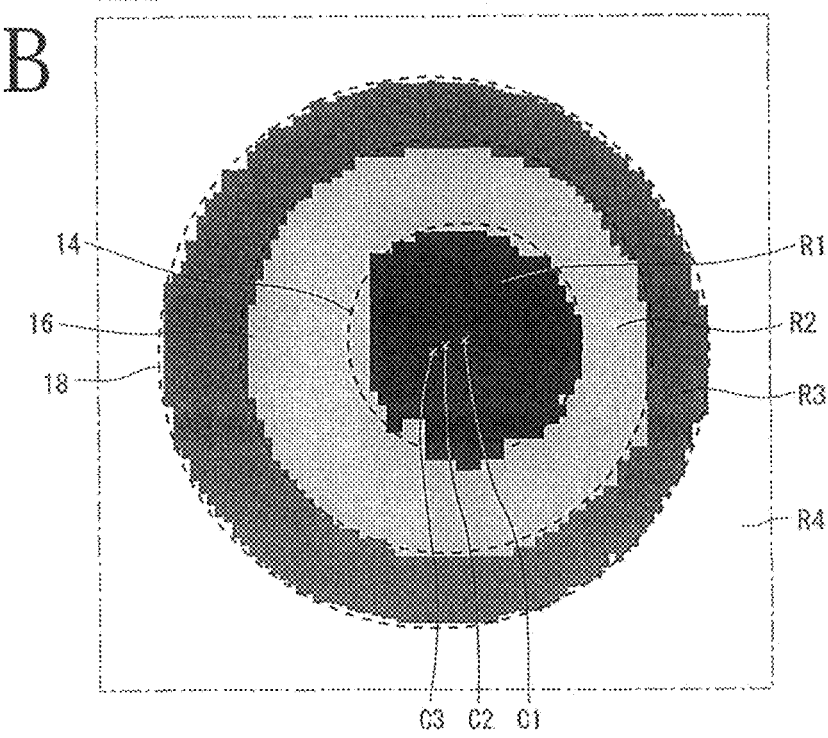
FIG. 2B is a schematic diagram of a sectional image of a laser beam in which the respective centers of the inner ring, the intermediate ring, and the outer ring are deviated from each other.

The processing means 10 calculates the area of the first region R1 based on the sectional image of the laser beam LB having undergone four-valued processing, calculates the diameter of a circle having the same area as the calculated area of the first region R1, and calculate the center of gravity of the first region R1. As depicted in FIGS. 2A and 2B, the processing means 10 sets the calculated center of gravity of the first region R1 to a center C1, and based on the calculated diameter of the circle (the circle corresponding to the first region R1), processing is performed to draw an inner ring 14 on the sectional image of the laser beam LB having undergone the four-valued processing.

In addition, the processing means 10 calculates a total area of the first and second regions R1 and R2 based on the sectional image of the laser beam LB having undergone the four-valued processing, calculates the diameter of a circle having the same area as the calculated total area of the first and second regions R1 and R2, and calculates the center of gravity of the second region R2. As depicted in FIGS. 2A and 2B, the processing means 10 sets the calculated center of gravity of the second region R2 to a center C2, and based on the calculated diameter of the circle (the circle corresponding to the first and second regions R1 and R2), processing is performed to draw an intermediate ring 16 on the sectional image of the laser beam LB having undergone the four-valued processing.

Further, the processing means 10 calculates a total area of the first, second, and third regions R1, R2, and R3 based on the sectional image of the laser beam LB having undergone the four-valued processing, calculates the diameter of a circle having the same area as the calculated total area of the first, second, and third regions R1, R2, and R3, and calculates the center of gravity of the third region R3. As depicted in FIGS. 2A and 2B, the processing means 10 sets the calculated center of gravity of the third region R3 to a center C3, and based on the calculated diameter of the circle (the circle corresponding to the first, second, and third regions R1, R2, and R3), processing is performed to draw an outer ring 18 on the sectional image of the laser beam LB having undergone the four-valued processing. In this way, the processing means 10 performs the processing of drawing the three rings, that is, the inner ring 14, the intermediate ring 16, and the outer ring 18, on the sectional image of the laser beam LB as equal beams of the laser beam LB.

The processing means 10 in the present embodiment calculates a deviation amount between the center C1 of the inner ring 14 (the center of gravity of the first region R1) and the center C3 of the outer ring 18 (the center of gravity of the third region R3) or the center C2 of the intermediate ring 16 (the center of gravity of the second region R2). The processing means 10 may be configured to determine that the use of the laser oscillator 4 is permitted when the deviation amount of the center C1 of the inner ring 14 and the center C2 of the intermediate ring 16 or the center C3 of the outer ring 18 is equal to or less than a predetermined value (for example, equal to or less than 5% of the diameter of the outer ring 18), and that the use of the laser oscillator 4 is not permitted when the deviation amount exceeds the predetermined value. Note that FIG. 2A depicts a schematic diagram of the sectional image of the laser beam LB in the case where the respective centers C1, C2, and C3 of the inner ring 14, the intermediate ring 16, and the outer ring 18 agree with each other, whereas FIG. 2B depicts a schematic diagram of the sectional image of the laser beam LB in the case where the respective centers C1, C2, and C3 of the inner ring 14, the intermediate ring 16, and the outer ring 18 are deviated and where the deviation amount of the center of gravity C1 of the inner ring 14 and the center C3 of the outer ring 18 exceeds the predetermined value.

The display unit 12 may include a display device having a liquid crystal screen or the like. As depicted in FIG. 1, the display unit 12 is electrically connected to the processing means 10, and the sectional image of the laser beam LB processed by the processing means 10 is sent to the display unit 12.

The display unit 12 displays at least the inner ring 14 and the outer ring 18 together with the sectional image of the laser beam LB processed by the processing means 10. The display unit 12 in the present embodiment further displays the intermediate ring 16 and displays the respective centers C1, C2, and C3 of the inner ring 14, the intermediate ring 16, and the outer ring 18, as depicted in FIGS. 2A and 2B.

The display unit 12 may be configured to display the deviation amount acquired by the processing means 10, the results of determination made by the processing means 10 regarding whether or not the use of the laser oscillator 4 is permitted, and the like. The deviation amount displayed on the display unit 12 may be the deviation amount between the center C1 of the inner ring 14 and the center C3 of the outer ring 18, or may be the deviation amount between the center C1 of the inner ring 14 and the center C2 of the intermediate ring 16.

Figure 3:
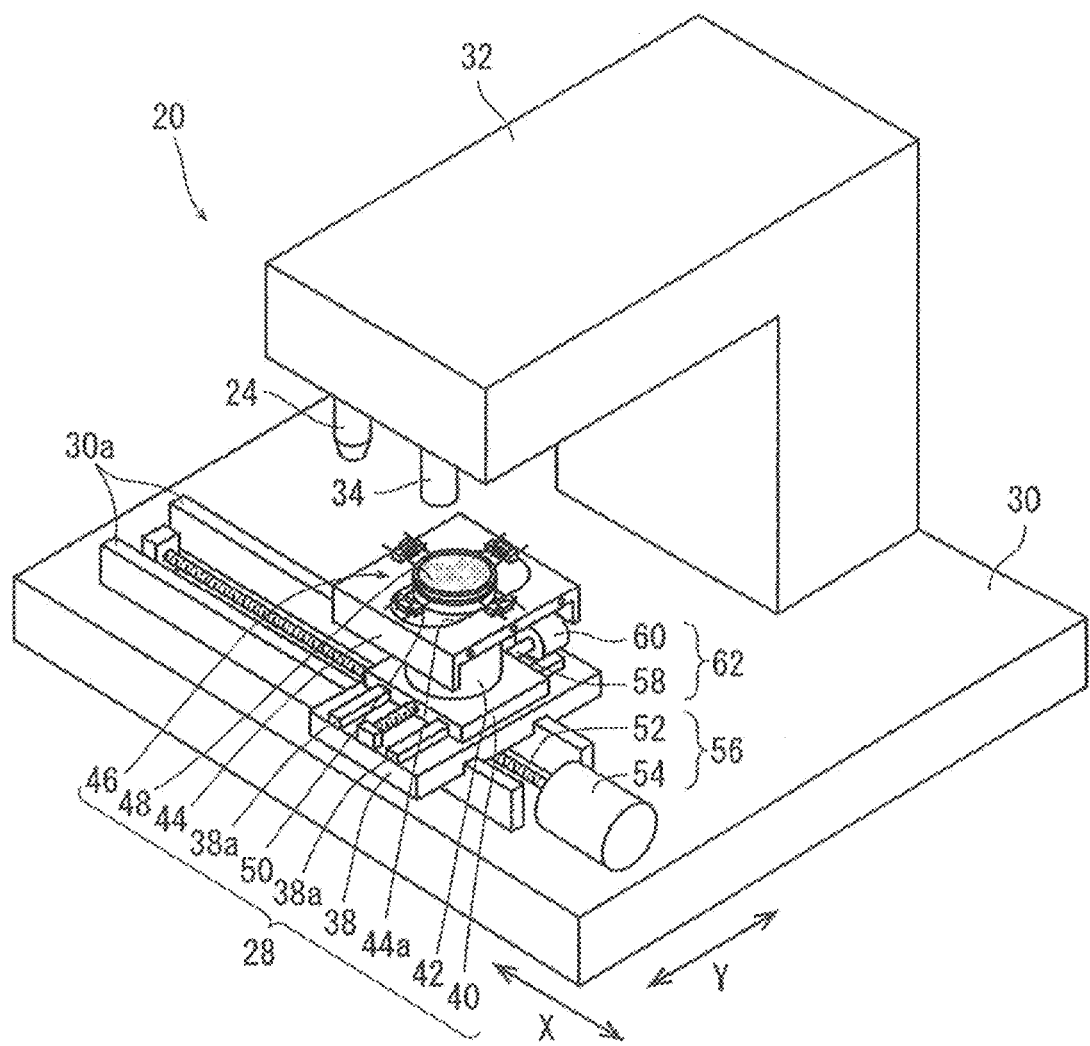
FIG. 3 is a perspective view of a laser processing apparatus which can be inspected by an inspection method of the present invention.
Figure 4:
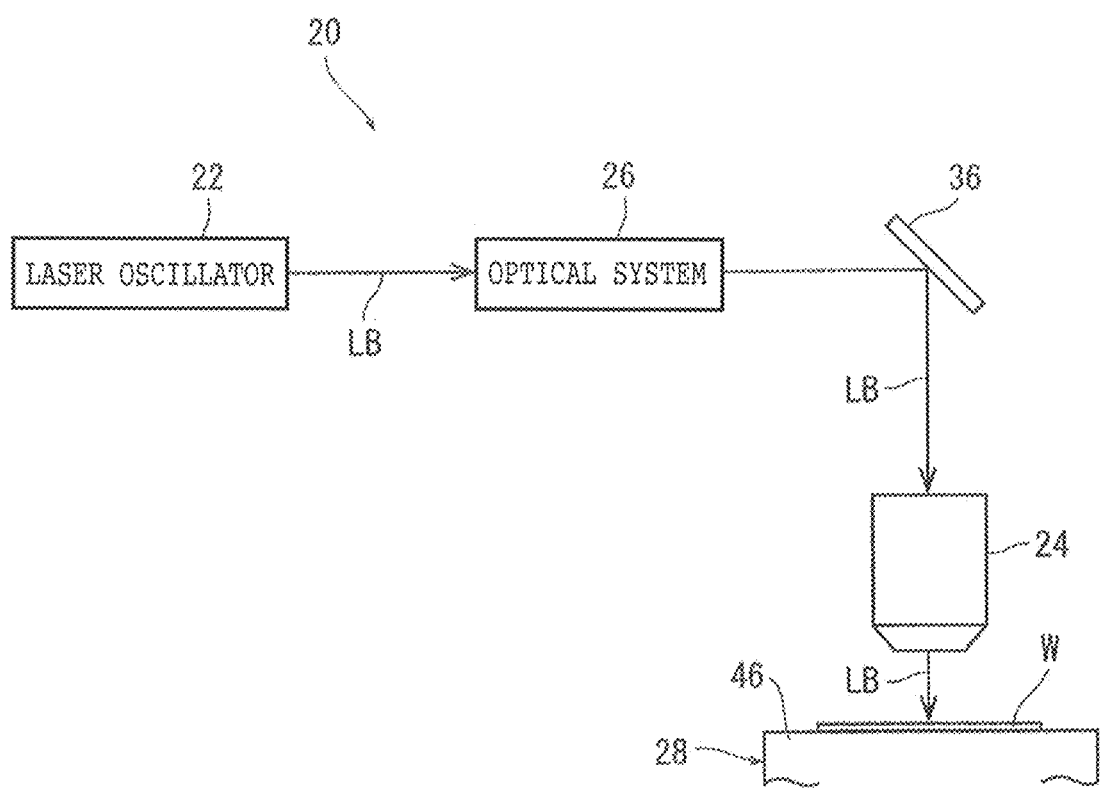
FIG. 4 is a block diagram of an essential part of the laser processing apparatus depicted in FIG. 3.

Next, the inspection method using the abovementioned inspection apparatus 2 will be described. FIG. 3 depicts a laser processing apparatus 20 with which the inspection method using the inspection apparatus 2 can be carried out, and FIG. 4 depicts a block diagram of the laser processing apparatus 20. The laser processing apparatus 20 includes a laser oscillator 22 (see FIG. 4) that emits a laser beam LB, a beam condenser 24 (see FIGS. 3 and 4) that condenses the laser beam LB, an optical system 26 (see FIG. 4) that is disposed between the laser oscillator 22 and the beam condenser 24 and that guides the laser beam LB, and a holding unit 28 (see FIGS. 3 and 4) that holds a workpiece W to be processed by the laser beam LB condensed by the beam condenser 24.

As depicted in FIG. 3, the laser processing apparatus 20 includes a base 30 and a housing 32 extending upward from an upper surface of the base 30 and then extending substantially horizontally. The laser oscillator 22 and the optical system 26 are disposed in the housing 32, and the beam condenser 24 is disposed at a lower surface of a tip of the housing 32. Note that a camera 34 that images the workpiece W held by the holding unit 28 and detects a region to be laser processed is mounted to the lower surface of the tip of the housing 32.

The laser oscillator 22 emits, for example, the laser beam LB (what is called seed light) having a repetition frequency of approximately several tens of megahertz and an output of approximately several milliwatts. The optical system 26 includes repetition frequency converting means (not illustrated) that converts the repetition frequency of the laser beam LB emitted from the laser oscillator 22, into an appropriate repetition frequency (for example, of approximately several hundreds of kHz), an output amplifier (not illustrated) that amplifies the output of the laser beam LB emitted from the laser oscillator 22, to an appropriate output (for example, of approximately several tens of W), output adjusting means (not illustrated) that adjusts the output of the laser beam LB amplified by the output amplifier, to an appropriate output, and wavelength converting means (not illustrated) that converts the wavelength of the laser beam LB emitted from the laser oscillator 22, into an appropriate wavelength. As illustrated in FIG. 4, the laser beam LB emitted from the laser oscillator 22 is converted into an appropriate frequency, output, and wavelength by the optical system 26 and is then reflected by a mirror 36. The reflected laser beam LB is guided to the beam condenser 24, condensed at the beam condenser 24, and then applied to the workpiece W.

Referring to FIG. 3, the holding unit 28 includes an X-axis movable plate 38 mounted on the base 30 such as to be movable in an X-axis direction indicated by an arrow X, a Y-axis movable plate 40 mounted on the X-axis movable plate 38 such as to be movable in a Y-axis direction (a direction indicated by an arrow Y) orthogonal to the X-axis direction, a support column 42 fixed to an upper surface of the Y-axis movable plate 40, and a cover plate 44 fixed to an upper end of the support column 42. Note that an XY plane defined by the X-axis direction and the Y-axis direction is substantially horizontal.

The cover plate 44 is formed with a slot 44a extending in the Y-axis direction, and a chuck table 46 extending upward through the slot 44a is mounted on an upper end of the support column 42 in a rotatable manner. The chuck table 46 is rotated by a rotating unit (not illustrated) incorporated in the support column 42. A porous circular suction chuck 48 connected to suction means (not illustrated) is disposed at an upper end part of the chuck table 46. In the chuck table 46, with a suction force generated at the upper surface of the suction chuck 48 by the suction means, the workpiece W placed on the upper surface of the suction chuck 48 is suction held. In addition, a plurality of clamps 50 are disposed at a peripheral edge of the chuck table 46 at intervals along the circumferential direction.

The holding unit 28 is subjected to processing feeding in the X-axis direction along guide rails 30a on the base 30, by an X-axis feeding mechanism 56 that includes a ball screw 52 connected to the X-axis movable plate 38 and extending in the X-axis direction and a motor 54 configured to rotate the ball screw 52. In addition, the holding unit 28 is subjected to indexing feeding in the Y-axis direction along guide rails 38a on the X-axis movable plate 38, by a Y-axis feeding mechanism 62 that includes a ball screw 58 connected to the Y-axis movable plate 40 and extending in the Y-axis direction and a motor 60 configured to rotate the ball screw 58.

At the time of inspecting the accuracy of the laser oscillator 22 of the laser processing apparatus 20 by use of the abovementioned inspection apparatus 2, an imaging unit positioning step of positioning the dimming plate 6 and the imaging unit 8 of the inspection apparatus 2 between the laser oscillator 22 and the optical system 26 of the laser processing apparatus 20 is first conducted.

After the imaging unit positioning step is performed, an imaging step of imaging the laser beam LB by the imaging unit 8 immediately after the laser beam LB is emitted from the laser oscillator 22 of the laser processing apparatus 20 is conducted. The laser beam LB imaged by the imaging unit 8 in the imaging step is the laser beam LB dimmed by the dimming plate 6. In addition, the diameter of the section of the laser beam LB to be imaged by the imaging unit 8 is, for example, of approximately 5 to 6 mm.

After the imaging step is performed, a processing step of processing the image captured by the imaging unit 8, by the processing means 10 is carried out. In the processing step, the sectional image of the laser beam LB is first subjected to four-valued processing based on the three thresholds of the inner ring 14, the intermediate ring 16, and the outer ring 18, and the sectional image of the laser beam LB is partitioned by the processing means 10 into four regions, that is, the first to fourth regions R1, R2, R3, and R4, according to the intensity of the laser beam LB. Next, processing of drawing the inner ring 14, the intermediate ring 16, and the outer ring 18 on the sectional image of the laser beam LB having undergone four-valued processing is conducted by the processing means 10. Subsequently, the deviation amount between the center C1 of the inner ring 14 and the center C3 of the outer ring 18 or the center C2 of the intermediate ring 16 is calculated by the processing means 10.

After the processing step is performed, an inspecting step of displaying the image processed by the processing means 10 on the display unit 12 and inspecting the accuracy of the laser oscillator 22 of the laser processing apparatus 20 based on the image displayed on the display unit 12 is conducted.

In the inspecting step, the deviation amount between the center C1 of the inner ring 14 and the center C3 of the outer ring 18 or the center C2 of the intermediate ring 16 is displayed on the display unit 12, together with the sectional image of the laser beam LB processed by the processing means 10, and by confirming the image displayed on the display unit 12, it is determined whether or not the use of the laser oscillator 22 is to be permitted. In the determination of whether or not the use of the laser oscillator 22 is to be permitted, it may be determined that the use of the laser oscillator 22 is permitted when the deviation amount is equal to or less than a predetermined value (for example, equal to or less than 5% of the diameter of the outer ring 18), and it may be determined that the use of the laser oscillator 22 is not permitted when the deviation amount exceeds the predetermined value. Note that, in the case where the use of the laser oscillator 22 is not permitted, for example, replacement, removal, or addition of the frequency converting means, the output amplifier, or the wavelength converting means are performed, in addition to the replacement of the laser oscillator 22.

As above-described, in the present embodiment, the inner ring 14, the intermediate ring 16, and the outer ring 18 are displayed on the display unit 12 as equal beams of the laser beam LB, and the deviation amount between the center C1 of the inner ring 14 and the center C3 of the outer ring 18 or the center C2 of the intermediate ring 16 is displayed on the display unit 12; therefore, equal beams in Gaussian distribution of the laser beam LB can be detected with high accuracy, and the accuracy of the laser oscillator 22 can be inspected.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An inspection apparatus that inspects accuracy of a laser oscillator that oscillates a laser, the inspection apparatus comprising:
   a dimming plate that dims a laser beam immediately after the laser beam is emitted from the laser oscillator such that the laser beam passes from the laser oscillator to the dimming plate without passing through a lens;
   an imaging unit that images, with a plurality of pixels, the laser beam dimmed by the dimming plate;
   processing means that processes an image captured by the imaging unit; and
   a display unit that displays the image processed by the processing means,
   wherein the processing means has at least two thresholds of an inner ring and an outer ring used for partitioning intensity of the laser beam, and the display unit displays the inner ring and the outer ring,
   wherein the processing means has at least a threshold of an intermediate ring between the threshold of the inner ring and the threshold of the outer ring, and
   wherein the processing means calculates a deviation amount between a center of the inner ring and a center of the outer ring or a center of the intermediate ring, and the display unit displays the deviation amount.

2. An inspection method for a laser oscillator of a laser processing apparatus including the laser oscillator that oscillates a laser, a beam condenser that condenses a laser beam, an optical system that is disposed between the laser oscillator and the beam condenser and that guides the laser beam, and a chuck table that holds a workpiece subjected to processing by the laser beam condensed by the beam condenser, and an inspection apparatus that includes:
   a dimming plate that dims the laser beam immediately after the laser beam is emitted from the laser oscillator such that the laser beam passes from the laser oscillator to the dimming plate without passing through a lens;
   an imaging unit that images, with a plurality of pixels, the laser beam dimmed by the dimming plate;
   processing means that processes an image captured by the imaging unit; and
   a display unit that displays the image processed by the processing means,
   wherein the processing means has at least two thresholds of an inner ring and an outer ring used for partitioning intensity of the laser beam, and the display unit displays the inner ring and the outer ring,
   wherein the processing means has at least a threshold of an intermediate ring between the threshold of the inner ring and the threshold of the outer ring, and
   wherein the processing means calculates a deviation amount between a center of the inner ring and a center of the outer ring or a center of the intermediate ring, and the display unit displays the deviation amount,
   the inspection method comprising:
   an imaging unit positioning step of positioning the inspection apparatus, which includes both the imaging unit and the dimming plate, between the laser oscillator and the beam condenser of the laser processing apparatus such that the laser beam passes directly from the laser oscillator to the dimming plate without passing through a lens or other optical element that modifies the cross-section of the laser beam and then the laser beam passes directly from the dimming plate to the imaging unit;
   an imaging step of imaging the laser beam by the imaging unit after the laser beam is emitted from the laser oscillator
   a processing step of processing an image captured by the inspection apparatus, by the processing means; and
   an inspecting step of displaying the image processed by the processing means on the display unit and inspecting accuracy of the laser oscillator based on the image displayed on the display unit.

* * * * *